(12) United States Patent
Breidenthal et al.

(10) Patent No.: US 10,935,781 B2
(45) Date of Patent: Mar. 2, 2021

(54) MAXIMIZING ILLUMINATION FIBER IN AN ENDOSCOPE

(71) Applicant: INTUITIVE SURGICAL OPERATIONS, INC., Sunnyvale, CA (US)

(72) Inventors: Robert S. Breidenthal, Bolton, MA (US); Joseph N. Forkey, Princeton, MA (US); Robert N. Ross, Gardner, MA (US); Brian E. Volk, Jefferson, MA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 14 days.

(21) Appl. No.: 16/034,167

(22) Filed: Jul. 12, 2018

(65) Prior Publication Data

US 2018/0329199 A1 Nov. 15, 2018

Related U.S. Application Data

(63) Continuation of application No. 13/403,188, filed on Feb. 23, 2012, now Pat. No. 10,031,330.
(Continued)

(51) Int. Cl.
*G02B 27/22* (2018.01)
*G02B 23/24* (2006.01)

(52) U.S. Cl.
CPC ..... *G02B 23/2461* (2013.01); *G02B 23/2415* (2013.01)

(58) Field of Classification Search
CPC .............. G02B 23/2461; G02B 23/2476; G02B 27/22; G02B 23/24–2423;
(Continued)

(56) References Cited

U.S. PATENT DOCUMENTS

| 4,721,097 A | 1/1988 | D'Amelio |
| 4,790,295 A | 12/1988 | Tashiro |

(Continued)

FOREIGN PATENT DOCUMENTS

| EP | 0723175 A1 | 7/1996 |
| EP | 1371321 A1 | 12/2003 |

(Continued)

OTHER PUBLICATIONS

International Search Report for Application No. PCT/US2012/26307, dated Dec. 14, 2012, 3 pages.
(Continued)

*Primary Examiner* — Jade R Chwasz
*Assistant Examiner* — Jyotsna V Dabbi
(74) *Attorney, Agent, or Firm* — Haynes and Boone, LLP

(57) ABSTRACT

A stereoscopic endoscope includes an outer tube with an internal cavity, an insert, first and second image forming assemblies, first and second optical fiber bundles, and a first adapter. The insert is positioned within the outer tube and has a first side and a second side each including a concave outer surface. The insert holds the first and second image forming assemblies in a parallel relationship. Each optical fiber bundle substantially fills a non-circular void in the outer tube defined as a cross- sectional area between a respective side of the insert and a respective portion of an inner surface of the outer tube. The first adapter is configured to connect at least one of the first optical fiber bundle and the second optical fiber bundle to an illumination source.

19 Claims, 7 Drawing Sheets

Related U.S. Application Data

(60) Provisional application No. 61/445,932, filed on Feb. 23, 2011.

(58) Field of Classification Search
CPC ...... G02B 23/2453–2476; A61B 10/04; A61B 1/00; A61B 1/07; A61B 1/018; A61B 1/00064–00066; A61B 1/0008; A61B 1/00096; A61B 1/00163–00167; A61B 1/00193; A61B 1/00135–00137; A61B 1/00165
USPC .......... 359/462, 368, 380, 384; 600/101–183
See application file for complete search history.

(56) References Cited

U.S. PATENT DOCUMENTS

| | | | |
|---|---|---|---|
| 5,448,990 | A | 9/1995 | De Faria-Correa |
| 5,603,687 | A | 2/1997 | Hori et al. |
| 5,742,429 | A | 4/1998 | Tsumanuma et al. |
| 5,989,183 | A | 11/1999 | Reisdorf et al. |
| 6,142,932 | A | 11/2000 | Morizumi |
| 6,221,007 | B1 | 4/2001 | Green |
| 2003/0181823 | A1 | 9/2003 | Gatto |
| 2003/0233024 | A1 | 12/2003 | Ando |
| 2010/0160903 | A1 | 6/2010 | Krespi |
| 2010/0204609 | A1 | 8/2010 | Worth et al. |
| 2010/0261961 | A1 | 10/2010 | Scott et al. |
| 2011/0177931 | A1 | 7/2011 | Kelland et al. |
| 2012/0212813 | A1 | 8/2012 | Breidenthal et al. |

FOREIGN PATENT DOCUMENTS

| | | |
|---|---|---|
| JP | 1101957 A | 4/1989 |
| JP | H05203881 A | 8/1993 |
| JP | H06160730 A | 6/1994 |
| JP | H0850252 A | 2/1996 |
| JP | H0862532 A | 3/1996 |
| JP | H08117184 A | 5/1996 |
| JP | 2000010022 A | 1/2000 |
| JP | 2001017381 A | 1/2001 |
| JP | 2002159440 A | 6/2002 |
| JP | 2004016410 A | 1/2004 |
| JP | 2008206624 A | 9/2008 |
| WO | WO-9602863 A1 | 2/1996 |

OTHER PUBLICATIONS

Office Action dated Jan. 26, 2016 for Japanese Application No. 2013-555556, filed Feb. 23, 2012, 8 pages.

Extended European Search Report for Application No. 12750295.3, dated Jul. 28, 2017, 7 pages.

Written Opinion for Application No. PCT/US2012/26307, dated Dec. 14, 2012, 4 pages.

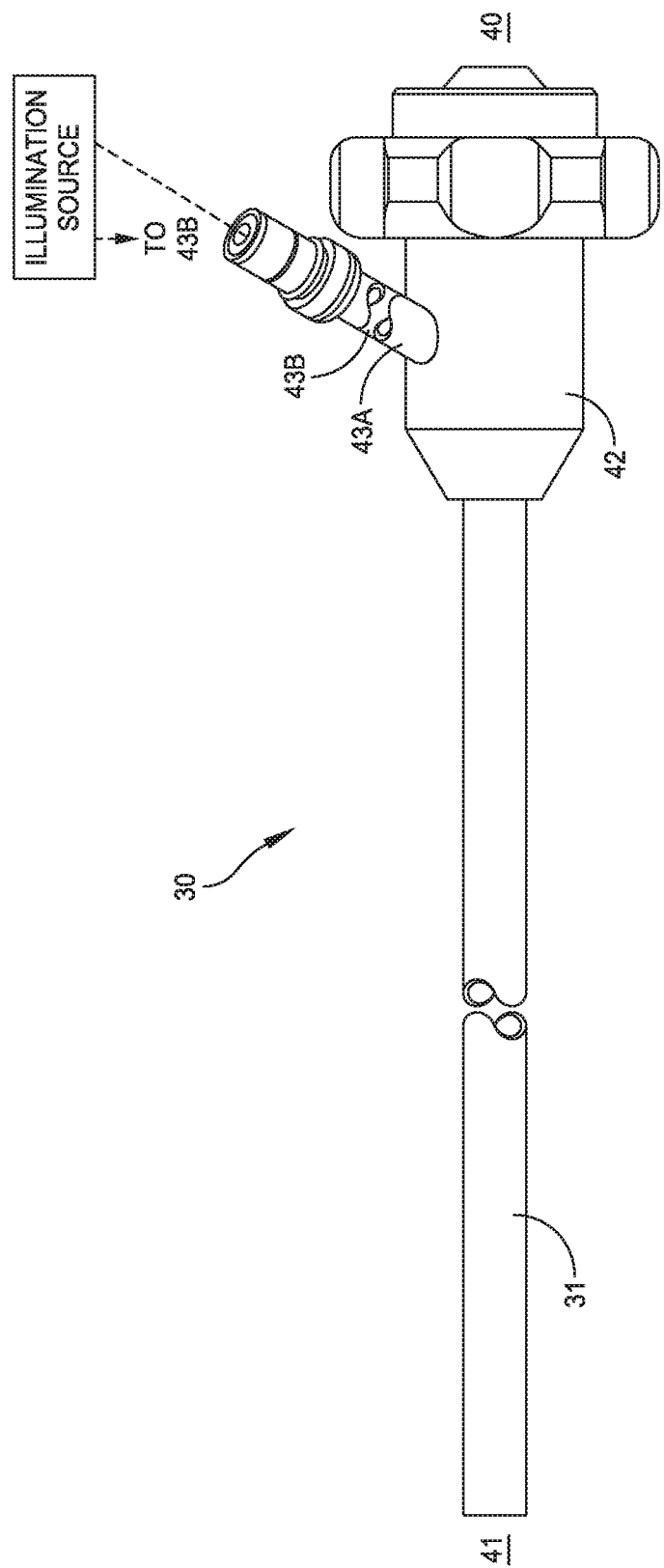

US 10,935,781 B2

MAXIMIZING ILLUMINATION FIBER IN AN ENDOSCOPE

CROSS-REFERENCE TO RELATED APPLICATIONS

This application is a continuation application of U.S. application Ser. No. 13/403,188, filed Feb. 23, 2012, which claims the benefit of U.S. Provisional Application No. 61/445,932 filed Feb. 23, 2011 for Maximizing Illumination Fiber in an Endoscope both of which are incorporated herein by reference in their entireties.

BACKGROUND OF THE INVENTION

Field of the Invention

This invention generally relates to endoscopes and particularly to maximizing illumination provided by stereoscopic or other endoscopes that contain multiple optical channels.

Description of Related Art

FIG. 1 is cross section of a single-channel endoscope 10 constructed in accordance with known traditional methods. In this specific embodiment the endoscope 10 includes an inner tube 11 that contains a single lens train (not shown) to form an optical train subassembly. An outer tube 12 is concentric with the inner tube 11 and forms an annulus which contains optical fiber 13. With this construction the optical fiber 13 fills the annulus, is sandwiched between the inner and outer tubes 11 and 12 and is constrained along the entire working length of the endoscope 10. As the annulus is filled, its entire volume is used to transfer illumination from an external source to an object being viewed at the distal end of the endoscope.

FIG. 2 depicts a cross-section of a stereoscopic endoscope 20 also constructed in accordance with known, traditional methods. In this embodiment, the endoscope 20 includes an outer tube 21 that carries an optical lens train subassembly 22 within an inner tube 22A and another optical lens train 23 within an inner tube 23A. Two optical fiber bundles 24 and 25 are positioned between the outer tube 21 and the optical train subassemblies 22 and 23, and each is enclosed in a sheath 26. This construction allows the optical train subassemblies 22 and 23 to be mounted without interference with the optical fiber bundles 24 and 25. However, the requirement for fitting the optical fiber bundles 24 and 25 between the outer tube 21 and the optical train subassemblies 22 and 23 limits them to a construction that leaves unused voids 28 along the length of the endoscope 20.

As known, when the illumination at the distal end of an endoscope increases, it is easier to obtain a high quality image. That is, for a given optical design image quality is dependent upon the level of illumination at the object being imaged beyond the distal end of the endoscope. As the construction in FIG. 2 does not fill the voids 28 between the outer tube 21 and the optical train assemblies 22 and 23, the illumination level at the object is less than a maximum value. Consequently, in many instances, particularly as stereoscopic endoscopes are made with smaller outside diameters, image quality suffers. Yet such a construction has remained the construction of choice for stereoscopic endoscopes.

SUMMARY

Therefore, it is an object of this invention to provide a multiple channel endoscope that maximizes illumination of an object at the distal end thereof.

Another object of this invention is to provide a two-channel stereoscopic endoscope that maximizes illumination of an object at the distal end thereof.

Yet another object of this invention is to provide a stereoscopic endoscope in which substantially all the voids between an outer tube and the two optical train subassemblies carry optical fiber between the proximal and distal ends of the endoscope.

Still another object of this invention is to provide a stereoscopic endoscope in which substantially all the voids between an outer tube and the two optical train subassemblies carry optical fiber and in which the manufacture of such an endoscope is predictable, repeatable and reliable.

In accordance with one aspect of this invention, a stereoscopic endoscope extends between proximal and distal ends and comprises a main body at the proximal end, an outer tube extending from the main body to the distal end of the endoscope, first and second inner tubes, proximal and distal inserts and first and second optical fiber bundles. The main body has an internal cavity and at least one fiber port that passes optical fiber from the exterior of the endoscope into the internal cavity. Each of the first and second inner tubes is located within the outer tube and includes a lens train assembly that extends proximally from the distal end and that is located in the outer tube. The proximal and distal inserts are inserted at the proximal and distal ends of the outer tube. Each insert has a support that positions the first and second inner tubes along parallel paths and that defines first and second voids between the insert and the inner surface of the outer tube. The first and second optical fiber bundles extend from the at least one fiber port through the first and second voids, respectively, to the distal end of the endoscope whereby the voids between the inserts and the inner surface of the outer tube are substantially filled with fiber.

In accordance with another aspect of this invention, a stereoscopic endoscope extends between proximal and distal ends and comprises a main body at the proximal end having an internal cavity and having at least one fiber port that passes optical fiber from the exterior of the endoscope into the internal cavity. An outer tube extends from the main body to the distal end of the endoscope. First and second imaging forming assemblies extend proximally from the distal end in the outer tube. A distal insert at the distal end of the outer tube includes a support that positions the first and second image forming assemblies along parallel paths and that defines first and second voids that extend between the inner surface of the outer tube and the distal insert over a portion of the outer tube that is coextensive with the insert. First and second optical fiber bundles extend from the main body toward the distal end and then through the first and second voids, respectively whereby the voids between the distal insert and the outer tube at the distal end are substantially filled with fiber.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 4 is a plan view of a stereoscopic endoscope that incorporates this invention;

DESCRIPTION OF ILLUSTRATIVE EMBODIMENTS

Figure 1:
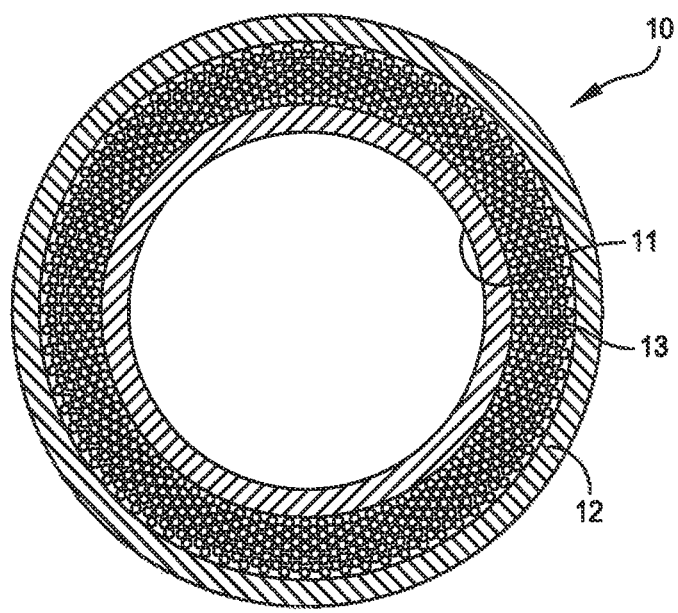
FIG. 1 is a simplified cross-section in schematic form of a prior art single-channel endoscope.
Figure 2:
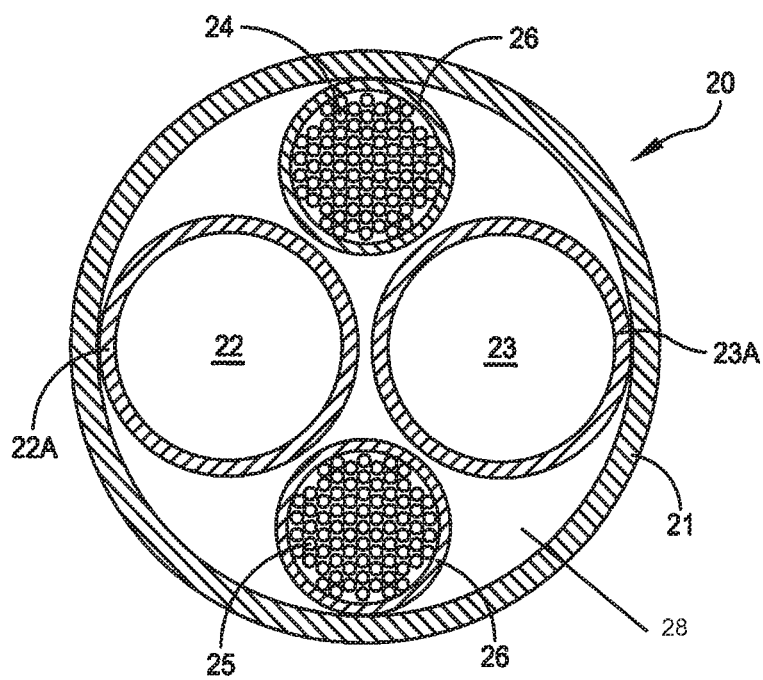
FIG. 2 is a simplified cross-section in schematic form of a prior art stereoscopic endoscope that incorporates optical train subassemblies to form images.
Figure 3:
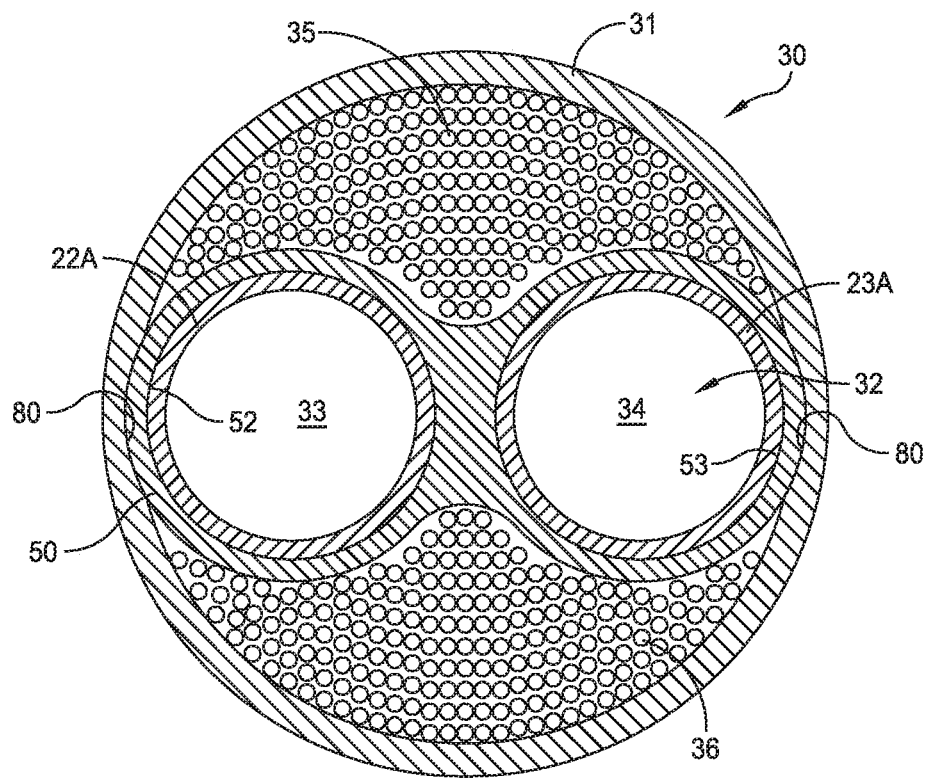
FIG. 3 is a cross-section near the distal end of a stereoscopic endoscope that incorporates this invention.

FIG. 3 depicts a cross-section adjacent the distal end of a stereoscopic endoscope 30 that incorporates this invention. The endoscope 30 includes an outer tube 31 and, in accordance with this invention, an insert having the characteristics of one such insert in accordance with this invention. The insert 32 defines parallel passages 33 and 34, Each of the passages 33 and 34 has a diameter adapted to receive and support ends of the inner tubes 22A and 23A that carry image forming subassemblies (i.e., the optical train subassemblies) to provide two optical channels in a close fitting relationship. As described later, a similar insert is located at the proximal end of the endoscope. Optical fiber bundles 35 and 36 substantially fill non-circular voids between the inner surface of the outer tube 31 and the opposite sides of the distal insert, 32. As a consequence, a stereoscopic endoscope constructed in accordance with this invention provides a maximum illumination transfer from the proximal end of the endoscope to an object beyond its distal end.

FIG. 4 is a plan view of the stereoscopic endoscope 30 that extends from a proximal end 40 to a distal end 41. A main body 42, with an internal cavity (not shown, but known in the art) at the proximal end 40 includes two fiber post adapters that include a first or near fiber post adapter 43A that is shown with a gap to make a portion of the second or far fiber post adapter 43B visible in FIG. 4. As known, each fiber post adapter connects to a fiber bundle from an external illumination source 45 and provides an interface with one of the optical fiber bundles 35 and 36 in FIG. 3. Still referring to FIG. 4, the main body 42 also carries the elongated outer tube 31 that extends to the distal end 41.

Figure 5:
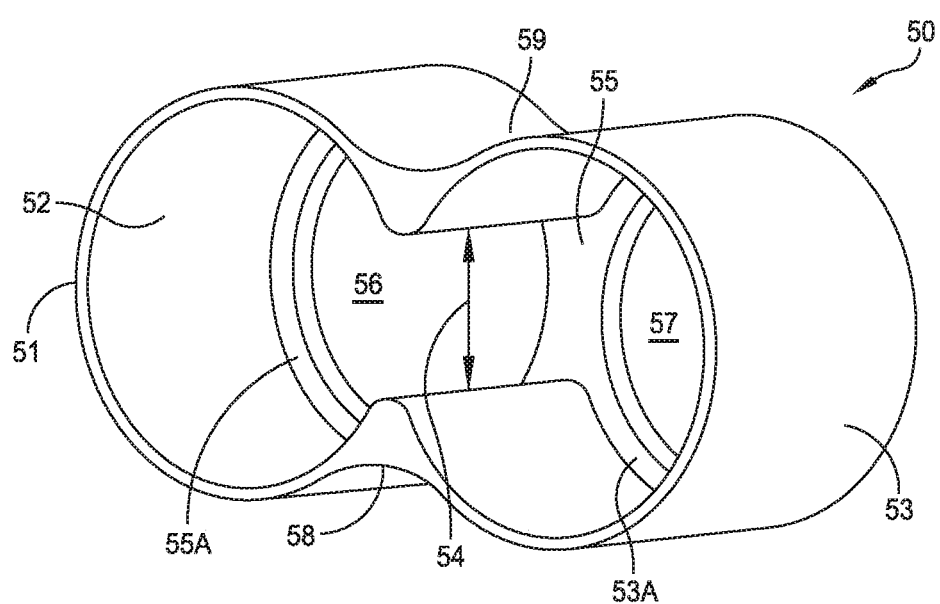
FIG. 5 is a perspective view of a distal end insert that is useful in implementing this invention.

FIG. 5 depicts a distal end insert 50 that is one implementation of the distal end insert 32 shown in FIG. 3. Still referring to FIG. 5, a housing 51 defines two proximally extending circular support portions 52 and 53 with an intermediate gap 54 in a central portion of the insert 50. An end plate 55 is adapted to abut the distal end of the outer tube 31 in FIG. 4 and includes first and second apertures 56 and 57 therethrough that correspond to the diameter of the optical train subassemblies, such as the optical train subassemblies 33 and 34 in FIG. 3. The end plate 55 in FIG. 5 also includes peripheral shoulders 53A and 55A that serve as an end stop during the insertion of the optical train subassemblies as described later. The inner diameter of the supports 52 and 53 enables each of them to receive one of the optical train subassemblies thereby to position and hold the optical train subassemblies in a parallel relationship with the appropriate optical spacing. The gap 54 provides limited flexibility to facilitate the receipt of the optical train subassemblies and simplifies manufacture of the insert. The insert 50 is also formed with cylindrical or curved troughs 58 and 59 that define, with the outer surfaces of the supports 52 and 53, the radially inner limits of non-circular voids that receive the optical fiber bundles, such as the optical bundles 35 and 36. As shown in FIGS. 3 and 5, the outermost surfaces of the support portions 52 and 53 contact the inner surface of the outer tube 31.

Figure 6:
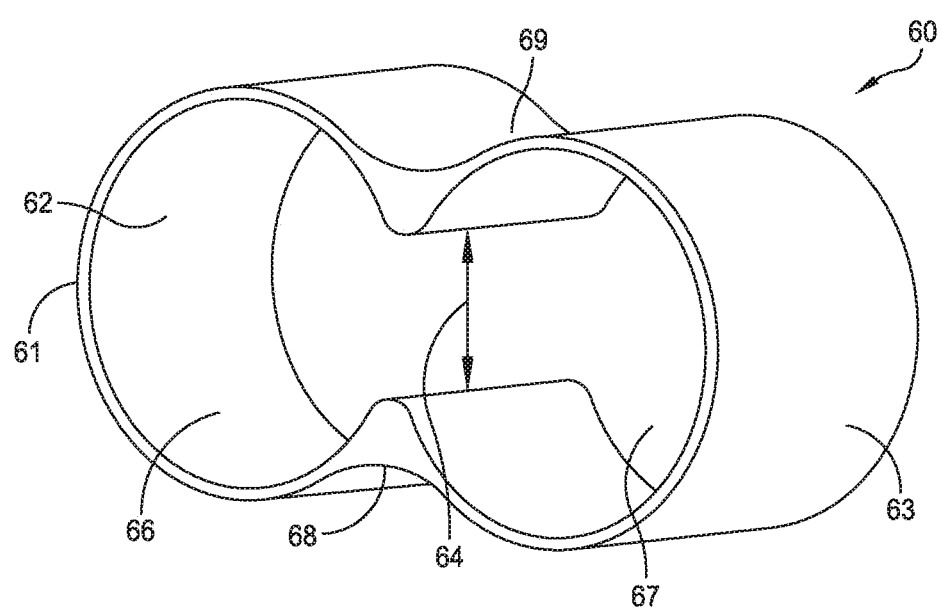
FIG. 6 is a perspective view of a proximal insert that is useful in implementing this invention.

FIG. 6 depicts a proximal insert 60 with a housing 61. The housing 61 defines two axially extending circular support portions 62 and 63 and an intermediate gap 64 that provide the same functions as the supports 52 and 53 and the gap 54 in FIG. 5. The proximal insert 60 has no end support for reasons that will become apparent. Like the distal insert 50, the proximal insert 60 includes cylindrical or curved troughs 68 and 69 that define, with the outer surfaces at the supports 62 and 63, the radially inner limits of the non-circular voids that receive the optical fiber bundles 35 and 36. Like the distal insert 50 shown in FIG. 3, the outermost surfaces of the support portions contact the inner surface of the outer tube 31 at the proximal end.

Figure 7:
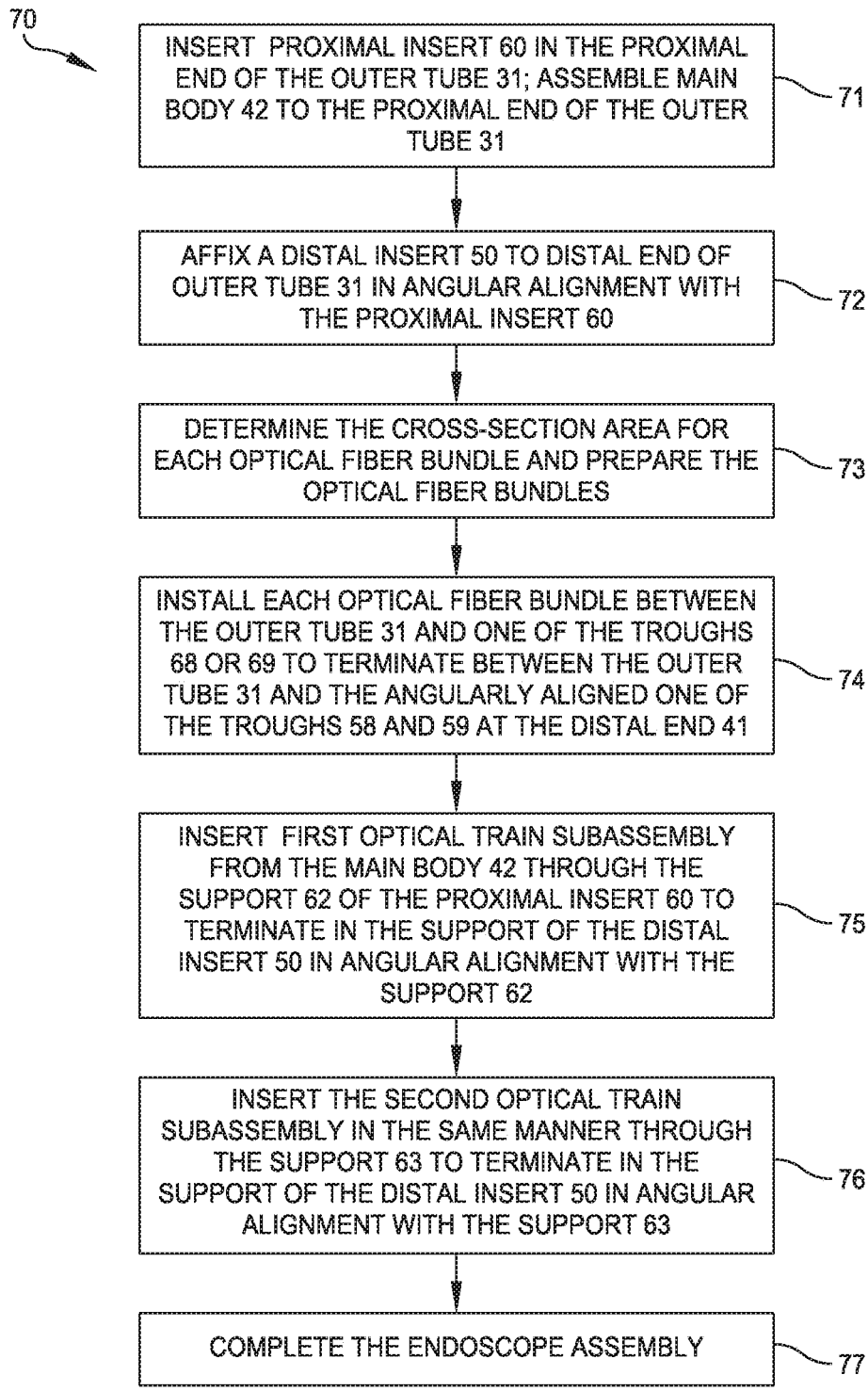
FIG. 7 is a flow chart that outlines the basic steps in manufacturing a stereoscopic endoscope that incorporates this invention.

A further understanding of this invention can be attained by describing the general process by which a stereoscopic endoscope is constructed. As shown in FIG. 7, one such process 70 begins at step 71 by assembling the main body 42 and outer tube 31 with a proximal insert 60 oriented and captured in the proximal end of the outer tube 31. In step 72 a distal insert 50 is affixed to the distal end of the outer tube 31. It is angularly aligned with the proximal insert 60 such that the apertures 56 and 57 lie on the axes of apertures 66 and 67, respectively, thereby to allow two optical train subassemblies to extend in parallel between the inserts 50 and 60.

Figure 3A:
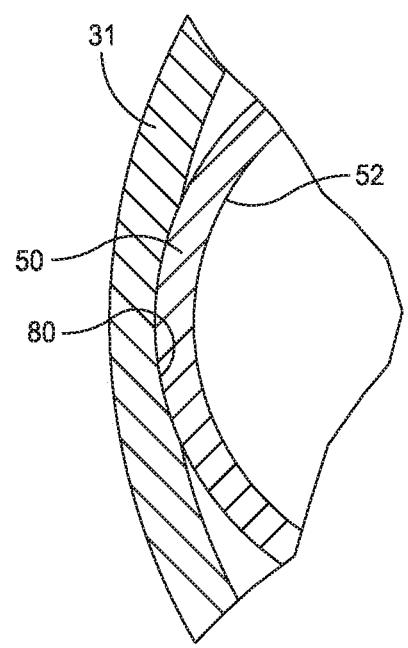
FIG. 3A is a detail to depict one embodiment of a structure that aligns inserts that are incorporated into a stereoscopic endoscope in accordance with this invention.

The inserts 50 and 60 are positioned in the outer tube to be angularly aligned so that the apertures 56 and 57 and the apertures 66 and 67 lie on parallel axes. In a preferred method, diametrically opposed detents or keyways, such as the keyway 80 in FIG. 3A, are formed in the inner surfaces at both ends of the outer tube 31. The keyways at the proximal and distal ends are angularly aligned and, at each end, extend for a distance that is greater than the depth of the insert to be installed at that end. In this embodiment each keyway is formed by machining a recess in the inner surface of the outer tube 31 having a radius that corresponds to the outer radius of the insert, such as the insert 50 as shown in FIG. 3A. In this embodiment, each insert, such as the distal end insert 50 in FIG. 3A has outer transverse dimension that causes the outer surfaces of a corresponding support portion to engage its corresponding keyway, such as the keyway 80, at the corresponding ends of the outer tube 31 in a detent fashion. This assures the angular alignment of the distal end insert 50 and the proximal insert 60 at distal and proximal ends, respectively, of the outer tube 31.

Step 73 represents the determination of the optical fiber bundle size that will be required to implement this invention. For a given stereoscopic endoscope two cross-sectional areas are determined. The first is the cross-sectional area inside the outer tube 31, $A_{outer\ tube}$; the second, $A_{insert}$ is the cross-sectional area defined by the outer periphery of the insert 50 in FIG. 5 or the insert 60 in FIG. 6. The difference taken by subtracting the second area from the first represents the total cross-sectional areas $A_{bundle}$ of the voids to be filled by the optical fiber bundles. As there are two distinct voids involved on opposite sides of the inserts, each bundle will have a cross-sectional area substantially corresponding to one-half of the total area difference. That is, for each bundle:

$$A_{bundle} \approx (A_{outer\ tube} - A_{insert})/2$$

Two optical fiber bundles are constructed with that cross-sectional area and an appropriate length. In a preferred process, a thin lubricious sheath, for example a polytetrafluoroethylene (PTFE) tube, is applied as a protective sheath to each optical fiber bundle. As will be apparent, step 73 can be performed prior to beginning the process 70.

Step 74 represents the process by which the two optical fiber bundles are next inserted into the endoscope. Typically, the fiber post adapters 43A and 43B in FIG. 4 have not yet been installed at this point in the manufacturing process. Each optical fiber bundle is drawn to the distal end through the proximal end and voids defined by the outer tube 31 and the inserts 50 and 60, Such drawing processes are known in the art. More specifically, each optical fiber bundle is drawn through an opening at one of the fiber post adapter positions, a designated one of the voids defined between the outer tube 31 and one of the troughs 68 and 69 in FIG. 6 to the distal end through a corresponding void defined by the outer tube 31 and the aligned one of the troughs 58 and 59 in FIG. 5.

The process continues with step 75 during which a first optical train subassembly is inserted into the endoscope through the proximal end of the main body 42, one of the supports 62 or 63 of the proximal insert 60, the previously installed optical fiber bundles until the distal end of the optical train subassembly abuts a corresponding one of the shoulders 55A about the apertures 56 and 57 in the distal insert 50 shown in FIG. 5. Step 76 repeats the operation of step 75 for the second optical train subassembly.

There are several different endoscope manufacturing processes for performing steps 75 and 76. In one approach, after the optical bundles are installed, they extend beyond the distal and proximal ends of the outer tube 31. As an initial step, two small-diameter pilot rods with bullet noses are inserted from the proximal end of the outer tube through the proximal insert supports 62 and 63 and between the optical fiber bundles 35 and 36 to emerge from corresponding ones of the apertures 56 and 57 in the distal insert 50. This pilot rod is then withdrawn leaving a corresponding passage. The operation is then repeated with second rods having the basic dimensions of the optical train subassemblies. These rods are advanced until the ends of the rods abut the shoulder 53A and 55A on the distal insert 50. As a next step, the optical fiber bundles 35 and 36 are bonded and cut at the distal and proximal ends. When this is completed, the second rods are removed leaving residual passages between the optical fiber bundles. Then the optical train subassemblies are inserted through those passages. During these operations, the proximal insert 60 is prevented from advancing distally in the optical tube 31 as by the interference between the distal end of the proximal insert 60 and the inner surfaces of the outer tube 31 adjacent the distal ends of the keyways, such as the keyway 80 in FIG. 3A.

Step 77 represents the completion of the endoscope in accordance with known operations, such as fitting the optical fiber bundles within their corresponding fiber post adapters 43 and installing the fiber post adapters.

FIG. 3 depicts a stereoscopic endoscope in which each imaging forming assembly is formed by an optical train bounded by an inner tube that extends from the main body through an outer tube to the distal end. Such optical trains include objective lenses, relay lenses and other optical elements. A second category of stereoscopic endoscopes uses a pair of spaced cameras at the distal end of the endoscope as its image forming assemblies. These cameras extend proximally only a short distance from the distal end; electrical conductors couple the cameras to processing equipment external to the endoscope. Such an endoscope can also benefit from this invention because a distal insert in accordance with this invention maximizes the cross section of the fiber that is exposed at the distal end and the level of illumination of the object being imaged.

Figure 8:
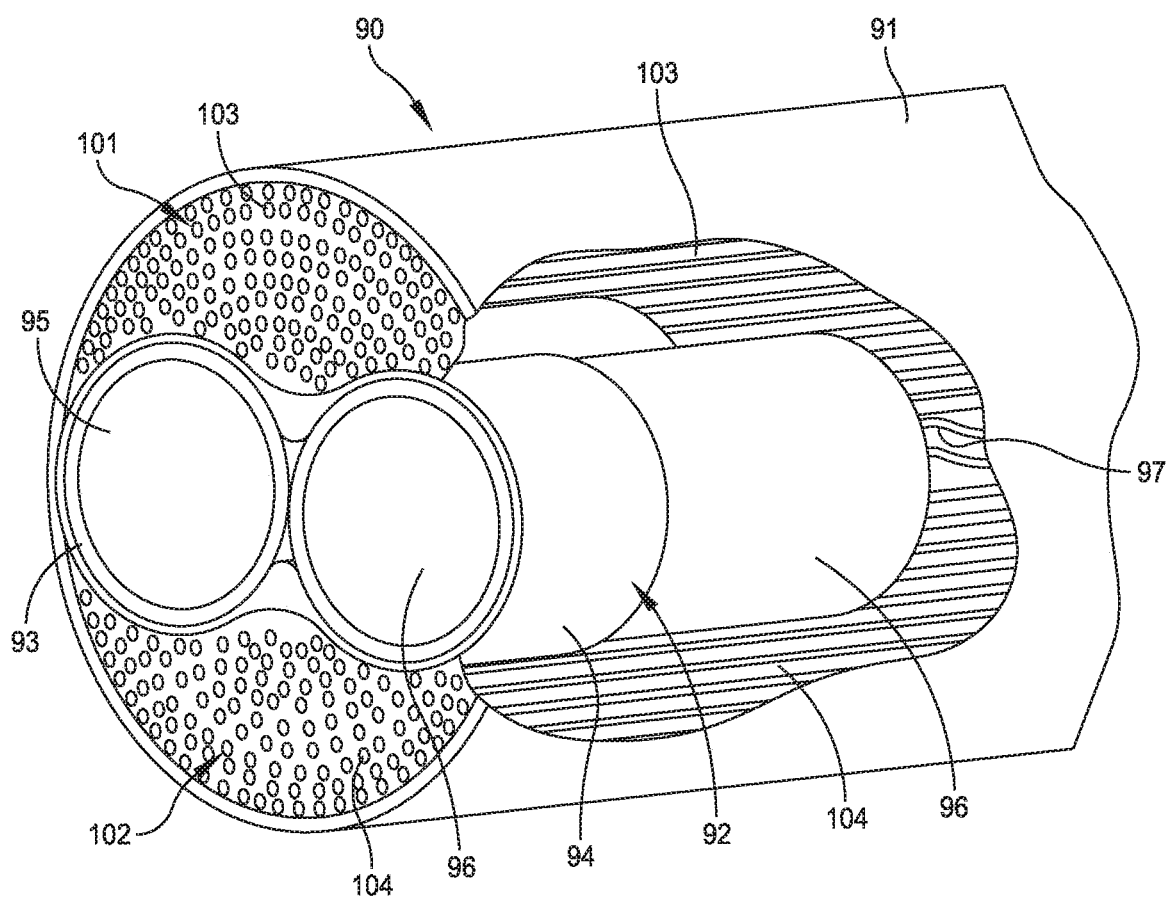
FIG. 8 is a perspective view, partially broken away, of the distal end of a stereoscopic endoscope that incorporates two camera assemblies as imaging forming assemblies.

FIG. 8 depicts the distal end of such a stereoscopic endoscope 90 in a perspective view that is partially broken away. An outer tube 91 extends from a main body, not shown in FIG. 8, to the distal end. The outer tube 91 receives a distal insert 92 in the same fashion as the distal insert, 50 in FIG. 3 is supported in the distal end of the outer tube 31. Referring to FIG. 8, the distal insert 92, having the same construction as shown in FIG. 5, includes supports 93 and 94 that receive camera subassemblies 95 and 96 and position them in a parallel relationship. Such camera subassemblies are known in the art and have a short axial length in comparison to optical train assemblies as described with respect to FIGS. 3 and 4, so the distal insert 92 provides adequate support thereby eliminating the necessity for a proximal insert. Leads from each of the camera assemblies 95 and 96, such as leads 97 from the camera assembly 96, extend to the proximal end of the endoscope 90 for connection to imaging processing equipment as known in the art.

With such a system, the distal insert 92 forms voids 101 and 102 between the exterior surface of the insert 92 and the inner surface of the outer tube 91. This space is then filled with fiber in fiber bundles 103 and 104 that extend from the distal end to at least one fiber post on a main body at the proximal end of the endoscope 90. Consequently, the camera subassemblies 95 and 96 operate with maximum illumination on the object to be imaged. Any changes to adapt the manufacturing process described with respect to FIG. 7 are within the skill of persons of ordinary skill in the art.

As now will be evident, a stereoscopic endoscope constructed in accordance with this invention achieves the various objects of this invention. Substantially all the voids within an outer tube are filled with optical fiber so the amount of light reaching a site to be viewed is maximized. Such an endoscope can be constructed in accordance with standard manufacturing processes with little or no modification so that the manufacture is predictable, repeatable and reliable.

This invention has been disclosed in terms of certain embodiments. It will be apparent that many modifications can be made to the disclosed apparatus without departing from the invention. For example, each insert is disclosed with a particular cross section including oppositely disposed troughs. Other inserts might modify such a trough structure of even eliminate such troughs. Other embodiments of alignment means could be substituted for the specifically disclosed keyway arrangement. In some applications, one might eliminate the peripheral shoulders of the distal insert. These and other modifications could be implemented while attaining some or all of the objectives and realizing some of all of the benefits of this invention. It is the intent of the appended claims to cover all such modifications and variations as come within the true spirit and scope of this invention.

What is claimed is:

1. A stereoscopic endoscope, comprising:
an outer tube having an internal cavity at a distal end of the stereoscopic endoscope;
an insert positioned within the outer tube, wherein the insert has a first side and a second side, wherein each of the first side and the second side includes a concave outer surface;
first and second image forming assemblies configured to extend into the internal cavity and into the insert, wherein the insert holds the first and second image forming assemblies in a parallel relationship;
a first optical fiber bundle substantially filling a first non-circular void in the outer tube, wherein the first non-circular void in the outer tube is defined as the entirety of a cross-sectional area between the first side of the insert and a first portion of an inner surface of the outer tube;
a second optical fiber bundle substantially filling a second non-circular void in the outer tube, wherein the second non-circular void is separate from the first non-circular void, and wherein the second non-circular void in the outer tube is defined as the entirety of a cross-sectional area between the second side of the insert and a second portion of the inner surface of the outer tube; and
a first adapter configured to connect at least one of the first optical fiber bundle and the second optical fiber bundle to an illumination source.

2. The stereoscopic endoscope of claim 1, further comprising a second adapter configured to connect the second optical fiber bundle to the illumination source.

3. The stereoscopic endoscope of claim 1, wherein the first adapter connects the second optical fiber bundle to the illumination source.

4. The stereoscopic endoscope of claim 1, wherein the first and second image forming assemblies are positioned between the first non-circular void and the second non-circular void.

5. The stereoscopic endoscope of claim 1, wherein the insert includes two proximally extending circular support portions, wherein an aperture is defined within each of the circular support portions, wherein a cylindrical outer perimeter of each aperture is discontinuous, and wherein an intermediate gap extends between the apertures.

6. The stereoscopic endoscope of claim 5, wherein the insert is configured such that the intermediate gap may be at least one of compressed or expanded such that a diameter of each aperture is changed.

7. The stereoscopic endoscope of claim 5, further comprising a first inner tube and a second inner tube, wherein each of the first inner tube and the second inner tube is received by one of the circular support portions, and wherein longitudinal axes of each of the first inner tube and the second inner tube are parallel to each other.

8. The stereoscopic endoscope of claim 7, further comprising an optical train assembly positioned within each of the first inner tube and the second inner tube.

9. The stereoscopic endoscope of claim 5, wherein each of the first side of the insert and the second side includes a trough extending between each of the circular support portions.

10. The stereoscopic endoscope of claim 9, wherein the trough includes at least one of a cylindrical surface or a curved surface.

11. A stereoscopic endoscope, comprising:
an outer tube having an internal cavity at a distal end of the stereoscopic endoscope;
an insert positioned within the outer tube, wherein the insert includes two proximally extending circular support portions, wherein an aperture is defined within each of the circular support portions, wherein a cylindrical outer perimeter of each aperture is discontinuous, and wherein an intermediate gap extends between the apertures;
first and second image forming assemblies configured to extend into the internal cavity and within the insert;
a first optical fiber bundle substantially filling a first non-circular void in the outer tube, wherein the first non-circular void in the outer tube is defined between a first side of the insert and a first portion of an inner surface of the outer tube;
a second optical fiber bundle configured to substantially fill a second non-circular void in the outer tube, wherein the second non-circular void is separate from the first non-circular void, and wherein the second non-circular void in the outer tube is defined between a second side of the insert and a second portion of the inner surface of the outer tube; and
a first adapter configured to connect at least one of the first optical fiber bundle and the second optical fiber bundle to an illumination source.

12. The stereoscopic endoscope of claim 11, wherein each of the first side and the second side includes a curved outer surface.

13. The stereoscopic endoscope of claim 11, further comprising a second adapter configured to connect the second optical fiber bundle to the illumination source.

14. The stereoscopic endoscope of claim 11, wherein the first adapter connects the second optical fiber bundle to the illumination source.

15. The stereoscopic endoscope of claim 11, wherein the first and second image forming assemblies are positioned between the first non-circular void and the second non-circular void.

16. The stereoscopic endoscope of claim 11, wherein the insert is configured such that the intermediate gap may be at least one of compressed or expanded such that a diameter of each aperture is changed.

17. The stereoscopic endoscope of claim 11, further comprising a first inner tube and a second inner tube, wherein each of the first inner tube and the second inner tube is received by one of the circular support portions, and wherein longitudinal axes of each of the first inner tube and the second inner tube are parallel to each other.

18. The stereoscopic endoscope of claim 17, further comprising an optical train assembly positioned within each of the first inner tube and the second inner tube.

19. The stereoscopic endoscope of claim 11, wherein each of the first side of the insert and the second side includes a trough extending between each of the circular support portions.

* * * * *